United States Patent
Chang et al.

(10) Patent No.: US 10,725,620 B2
(45) Date of Patent: *Jul. 28, 2020

(54) GENERATING INTERACTIVE MENU FOR CONTENTS SEARCH BASED ON USER INPUTS

(71) Applicant: KT CORPORATION, Gyeonggi-do (KR)

(72) Inventors: Du-Seong Chang, Gyeonggi-do (KR); Hyung-Keun Koo, Seoul (KR); Sang-Hee Kim, Seoul (KR); Joo-Won Sung, Seoul (KR); Min-Jeung Cho, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 122 days.

This patent is subject to a terminal disclaimer.

(21) Appl. No.: 15/676,327

(22) Filed: Aug. 14, 2017

(65) Prior Publication Data

US 2018/0011613 A1 Jan. 11, 2018

Related U.S. Application Data

(63) Continuation of application No. 13/791,658, filed on Mar. 8, 2013, now Pat. No. 9,733,795.

(30) Foreign Application Priority Data

Mar. 8, 2012 (KR) .................. 10-2012-0024034

(51) Int. Cl.
*G06F 3/0482* (2013.01)
*G06F 16/904* (2019.01)

(52) U.S. Cl.
CPC .......... *G06F 3/0482* (2013.01); *G06F 16/904* (2019.01)

(58) Field of Classification Search
CPC .................................................... G06F 3/0482
See application file for complete search history.

(56) References Cited

U.S. PATENT DOCUMENTS

| 8,949,465 | B2 | 2/2015 | Hunt et al. |
| 2003/0048309 | A1 | 3/2003 | Tambata et al. |
| 2004/0019608 | A1* | 1/2004 | Obrador ............... G06F 16/489 |
| 2005/0053359 | A1* | 3/2005 | Jung .................... G11B 27/105 |
| | | | 386/234 |
| 2006/0282789 | A1 | 12/2006 | Kim |
| 2008/0104127 | A1 | 5/2008 | Billmaier et al. |
| 2008/0209325 | A1 | 8/2008 | Suito et al. |
| 2009/0055356 | A1 | 2/2009 | Hanyu |
| 2009/0112848 | A1 | 4/2009 | Kunjithapatham et al. |

(Continued)

FOREIGN PATENT DOCUMENTS

| KR | 10-2006-0128202 A | 12/2006 |
| KR | 10-2010-0048374 A | 5/2010 |

(Continued)

*Primary Examiner* — William L Bashore
*Assistant Examiner* — Nathan K Shrewsbury
(74) *Attorney, Agent, or Firm* — IP Legal Services, LLC (57) ABSTRACT

The disclosure is related to a method for providing an interactive menu data for contents search. At least one query word may be generated based on user inputs at user equipment. A server may generate an interactive menu data based on the received at least one query word. The server may provide the generated interactive menu data to the user equipment.

14 Claims, 4 Drawing Sheets

(56) References Cited

U.S. PATENT DOCUMENTS

| | | |
|---|---|---|
| 2009/0125842 A1 | 5/2009 | Nakayama |
| 2010/0131548 A1 | 5/2010 | Moon et al. |
| 2010/0154005 A1 | 6/2010 | Baxter |
| 2010/0241663 A1 | 9/2010 | Huang et al. |
| 2011/0022549 A1* | 1/2011 | Zhuang ............... G06F 16/00 706/12 |
| 2011/0060592 A1 | 3/2011 | Kang et al. |
| 2011/0070819 A1 | 3/2011 | Shimy et al. |
| 2011/0072455 A1 | 3/2011 | Pickelsimer et al. |
| 2011/0145040 A1 | 6/2011 | Zahn et al. |
| 2011/0153613 A1 | 6/2011 | Lee |
| 2011/0179385 A1 | 7/2011 | Li et al. |
| 2011/0179452 A1* | 7/2011 | Dunker ............... G11B 27/034 725/53 |
| 2011/0223938 A1 | 9/2011 | Sakka |
| 2012/0041952 A1* | 2/2012 | Sohma ............... G06F 16/345 707/737 |
| 2012/0047437 A1 | 2/2012 | Chan |
| 2012/0310994 A1 | 12/2012 | Wionzek et al. |
| 2013/0042177 A1* | 2/2013 | Dunko ............... H04M 1/72522 715/716 |
| 2013/0054736 A1 | 2/2013 | Hunt et al. |
| 2013/0066902 A1 | 3/2013 | Iida et al. |
| 2013/0086519 A1 | 4/2013 | Fino |
| 2013/0145385 A1 | 6/2013 | Aghajanyan et al. |
| 2013/0174189 A1 | 7/2013 | Danker et al. |
| 2013/0232138 A1* | 9/2013 | Calvert ............... G06F 16/24569 707/722 |
| 2013/0239053 A1* | 9/2013 | Chang ............... G06F 16/904 715/810 |
| 2016/0086037 A1* | 3/2016 | Im ............... H04N 21/4668 725/14 |

FOREIGN PATENT DOCUMENTS

| | | |
|---|---|---|
| KR | 10-2010-0106673 A | 10/2010 |
| KR | 10-2011-0002655 A | 1/2011 |
| KR | 10-2011-0027362 A | 3/2011 |
| KR | 10-2011-0065860 A | 6/2011 |
| KR | 10-2011-0113084 A | 10/2011 |
| KR | 10-2012-0070850 A | 7/2012 |

* cited by examiner

GENERATING INTERACTIVE MENU FOR CONTENTS SEARCH BASED ON USER INPUTS

CROSS REFERENCE TO PRIOR APPLICATIONS

The present application is continuation application of U.S. patent application Ser. No. 13/791,658 (filed on Mar. 8, 2013), which claims priority under 35 U.S.C. § 119 to Korean Patent Application No. 10-2012-0024034 (filed on Mar. 8, 2012).

BACKGROUND OF THE INVENTION

Due to advanced technologies for communication, numerous digital contents stored in a server can be provided to a user who is separated from the server in a long distance. For example, an Internet protocol TV (IPTV) service provider stores numerous digital movies in a server and provides one of the stored digital movies upon the request of a user. Such an IPTV service provider may provide a graphic user interface (GUI) to a user through user equipment and enable the user to search for a desired movie among the numerous digital movies stored in the server through the provided GUI. Since there are numerous digital movies stored in the server, it is a time consuming process to the user for finding a desired movie through such a provided GUI.

SUMMARY OF THE INVENTION

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, an interactive menu for contents search may be generated based on at least one user inputs and provided to a user for efficiently searching desired contents with fewer search steps.

In accordance with at least one embodiment of the present invention, a method may be provided for providing an interactive menu data for contents search. The method may include receiving at least one query word generated based on user inputs from user equipment, generating an interactive menu data based on the at least one query word, and providing the generated interactive menu data to the user equipment.

In accordance with at least one embodiment of the present invention, a server may be provided for providing an interactive menu data for contents search based on a user input. The server may include a server, an interactive menu generator, and a provider. The receiver may be configured to receive at least one query word generated based on user inputs from user equipment. The interactive menu generator may be configured to generate an interactive menu data based on the received at least one query word. The provider may be configured to provide the generated interactive menu data to the user equipment.

In accordance with at least one embodiment of the present invention, a computer program product embodied on a computer readable storage medium, which when executed by a computer of a user equipment, the computer program product causes the computer to perform a method. The method may include receiving at least one query word generated based on user inputs from user equipment, generating an interactive menu data based on the at least one query word, and providing the generated interactive menu data to the user equipment.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment of the present invention, menu data for contents search may be dynamically and interactively generated based on user inputs and provided to user equipment. Such a dynamic and interactive menu may enable a user for efficiently finding a target-content from numerous digital contents stored in a server, such as movies, songs, documents, apps, and so forth. An internet protocol television (IPTV) service will be described as a representative example for utilizing the dynamic and interactive menu, but the present invention is not limited thereto. An overall view of providing such a dynamic and interactive menu will be described with reference to FIG. 1.

Figure 1:
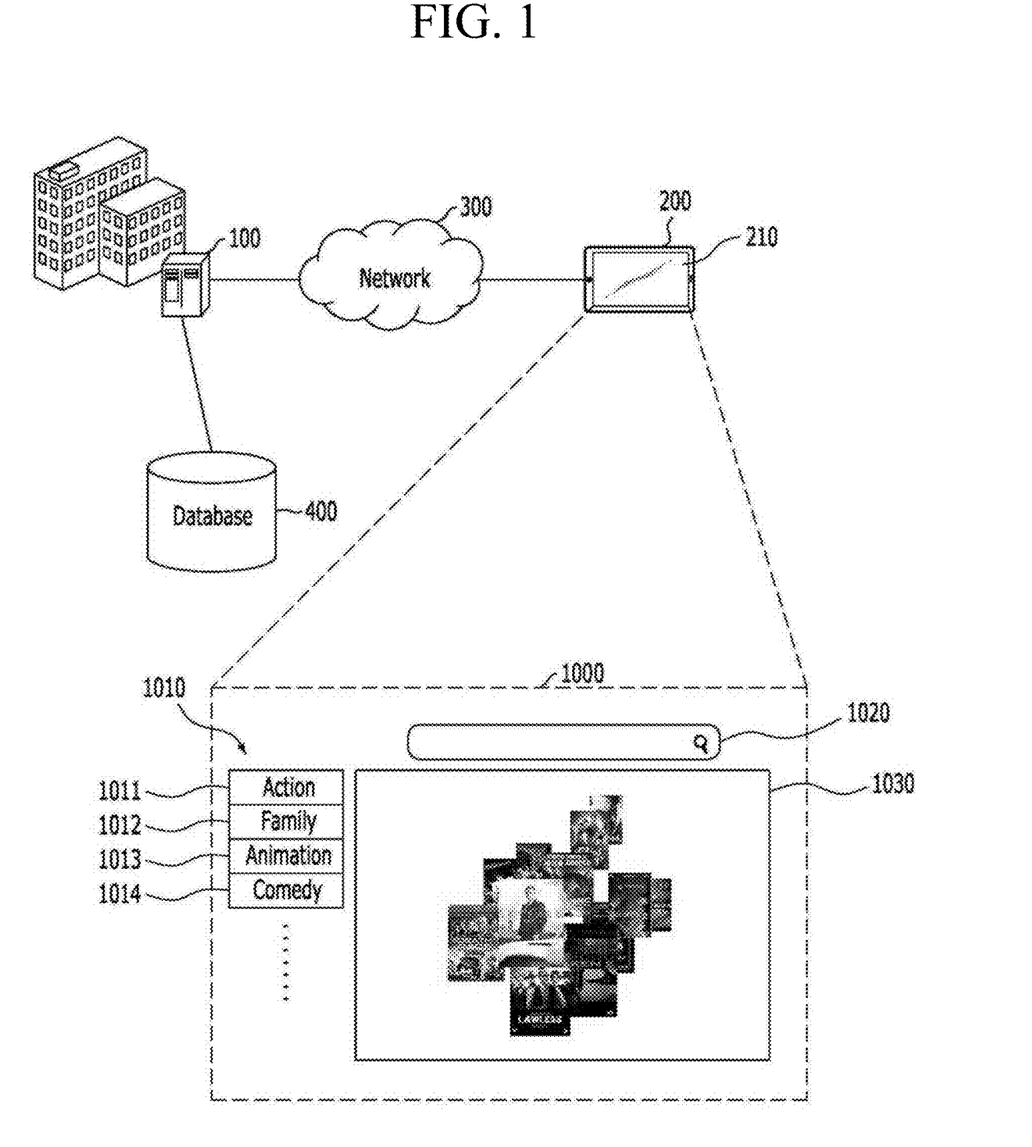
FIG. 1 is an overall view of providing a dynamic and interactive menu for contents search in accordance with at least one embodiment of the present invention.

FIG. 1 is an overall view of providing a dynamic and interactive menu for contents search in accordance with at least one embodiment of the present invention.

Referring to FIG. 1, server 100 may generate a dynamic and interactive menu for contents search based on a user input and provide the generated dynamic and interactive menu to user equipment 200 through network 300 in accordance with at least one embodiment of the present invention. User equipment 200 may receive the dynamic and interactive menu and display the received dynamic and interactive menu. Using the dynamic and interactive menu, a user may efficiently search for and select a target-content from numerous digital contents stored in database 400.

For the IPTV service, user equipment 200 may display default graphic user interface (GUI) 1000 for the IPTV service on display unit 210 of user equipment 200 when user equipment 200 is initiated or when user equipment 200 initially accesses server 100 for the IPTV service. Through default GUI 1000, a user may be enabled to search for and to select a desired movie from numerous movies and TV shows stored in database 400 coupled to server 100. After selecting the desired movie, server 100 may provide the selected movie to user equipment 200 and user equipment 200 may display the provided movie on display unit 210. For searching for and selecting a desired movie from numerous movies stored in server 100, default GUI 1000 may include menu 1010, search word input box 1020, and contents display area 1030. Menu 1010 may include a plurality of menu items 1011 to 1014 each associated with a respective keyword. The keyword may indicate a corresponding classification of movies or TV shows. The keyword may be one of movie genres such as TV shows, action & adventure, animations, children & family, documentaries, foreign, horror, romance, and so forth. Particularly, menu 1010 may include first menu item 1011 for action movies, second menu item 1012 for family movies, third menu item 1013 for animation movies, fourth menu item 1014 for comedy movies, and so forth, as shown in FIG. 1. When a user selects one of menu items 1011 to 1014, movies and TV shows related to a keyword of the selected menu item may be displayed in contents display area 1030. The user might select one of the movies displayed in contents display area 1030 if the user finds a desired movie among the displayed movies. If not, the user might select another menu item for further search. Furthermore, the user may use search word input box 1020 for search. Particularly, the user might enter any words related to a desired movie into search word input box 1020 for finding a desired movie among those stored in database 400. For example, the user might enter a word of "funny." In this case, movies having a funny story might be shown in contents display area 1030.

In accordance with at least one embodiment of the present invention, menu data for menu 1010 may be dynamically and interactively generated based on user inputs made for selecting one of menu items 1011 to 1014 and/or based on user inputs entered into search word input box 1020. Such dynamic and interactive menu data may be regenerated based on a new user input whenever a user selects one of menu items 1011 to 1014 and/or whenever the user enters a search word into search word input box 1020. The regenerated dynamic and interactive menu data may be provided to user equipment 200 and processed and displayed as the interactive menu. Accordingly, a user may be provided with a menu dynamically changed based on a user input and interacted with the user input. Such dynamic and interactive menu may enable a user to efficiently and conveniently find a desired movie from numerous stored digital contents with fewer search steps.

As described, server 100 may generate such dynamic and interactive menu data based on user input in accordance with at least one embodiment of the present invention. Such server 100 may be coupled to user equipment 200 through network 300. Network 300 may connect nodes, such as server 100 and user equipment 200, for exchanging data to each other. For example, network 300 may be any network that can connect one node to others for communication, such as the Internet, a local area network (LAN), a wireless local area network (WLAN), a wide area network (WAN), and a personal area network (PAN). Server 100 is illustrated as being located at a related service provider building which might be far away from user equipment 100, but the present invention is not limited thereto. Server 100 may be located in a comparatively short distance from user equipment 200. In this case, server 100 may be coupled to user equipment 200 through a physical cable and/or a wireless link. The physical cable may be any cable connecting one node to others for exchanging data to each other, such as a universal serial bus (USB) cable and a high-definition multimedia interface (HDMI) cable. The wireless link may be a Bluetooth communication link.

As described, server 100 may be coupled to user equipment 200 through network. Server 100 may be a computing system dedicated to run a related service, for example, an IPTV service provider, but the present invention is not limited thereto. Such server 100 may a set of computers installed at a specific location for providing various types of digital contents in response to a user input. Particularly, server 100 may provide initial menu data for default GUI 1000 to user equipment 200 when user equipment 200 initially accesses server 100 for having the IPTV service or when user equipment 200 is initiated. Through default GUI 1000 with the initial menu data, server 100 may enable a user to select specific contents such as a movie, a TV show, a song, and so forth, which are stored in database 400 coupled to server 100.

Server 100 may receive a query word from user equipment 200 in accordance with at least one embodiment of the present invention. Such query word may be generated based on a user input received through default GUI 1000. The user input may be a search word inputted into search word input box 1020 or a selection input for selecting one of menu items 1011 to 1014 included in the provided initial menu. In accordance with at least one embodiment, server 100 may dynamically and interactively regenerate menu for contents-search based on the received query word from user equipment 200. Such regenerated menu may be referred to as interactive menu. Server 100 may provide the generated dynamic and interactive menu to user equipment 200.

For example, server 100 may generate the initial menu data for menu 1010 of default GUI 1000 to user equipment 200 when user equipment 200 initially accesses sever 100 for the IPTV service. The initial menu may include at least one menu item associated with at least one keyword that might be classification of contents such as movies. Particularly, the initial menu may include a plurality of menu items each associated with a specific keyword. In case of the IPTV service, the initial menu may include menu items respectively associated with genres as a keyword such as TV shows, action & adventure, animations, children & family, documentaries, foreign, horror, romance, and so forth. As described, search word input box 1020 may be a user input box for enabling a user to input a search word for searching for a target-movie. A user may select one of menu items 1011 to 1014 in the initial menu or enter a search word in search word input box 1020 of default GUI 1000. Upon the receipt of the user input (e.g., inputting a search word or selecting one of the menu items in the default menu), user equipment 200 may generate a query word based on the user input and transmit the query word to server 100. The query word may be the search word inputted in search word input box 1020 or the keyword associated with the selected menu item.

Based on the query word, server 100 may select contents related to the query word from numerous digital contents stored in database 400. Such searching and selecting may be carried out using a keyword search method and a semantic search method. After selecting the contents related to the query word, server 100 may regenerate menu, such as interactive menu, based on information of the selected contents (e.g., metadata of the selected contents). That is, server 100 may dynamically and interactively regenerate menu based on the user input for selecting one of menu item in the initial menu and/or based on the search word entered in the search word input box in the default GUI in accordance with at least one embodiment of the present invention. The interactive menu may also include at least one menu item each associated with a keyword generated based on the selected contents.

User equipment 200 may be coupled to server 100 through network 300. User equipment 200 may be installed with a related software application or user equipment 200 may be dedicatedly manufactured for specially purpose such as an IPTV service. User equipment 200 may include display device 210 for displaying default GUI 1000 with the interactive menu produced based on the interactive menu data generated at server 100.

User equipment 200 may receive the initial menu data for default GUI 1000 having search word input box 1020 and display received default GUI 1000 on display unit 210. Particularly, user equipment 200 may receive the initial menu data, process the received initial menu data, and display the initial menu as menu 1010 in default GUI 1000 with search word input box 1020 in accordance with at least one embodiment of the present invention. Such user equipment 200 may receive user inputs for selecting at least one of menu items 1011 to 1014 included in the initial menu or receive a search word entered in search word input box 1020. User equipment 200 may generate a query word corresponding to the user inputs and transmit the query word to server 100. That is, the generated query word may be a keyword associated with a menu item selected by the user input. Also, the generated query word may be a search word entered into search word input box 1020 of default GUI 1000.

Furthermore, user equipment 200 may receive a dynamic and interactive menu which is generated based on the query word by server 100 and display the dynamic and interactive menu in accordance with at least one embodiment of the present invention. Such a dynamic and interactive menu may include menu items associated with keywords. The keywords may be determined based on contents selected based on the user input made based on the initial menu or the previous search word input. In addition, default GUI 1000 may include a voice recognition interface for entering a search word into search word input box 1020 or for selecting at least one of menu items of the initial menu or the interactive menu in accordance with at least one embodiment of the present invention.

Contents search using a typical menu will be described based on an IPTV service in brief. In case of the IPTV service, a user may search for a desired movie using a menu provided with a default GUI for the IPTV service or a user may input a search word in a search word input box provided with the default GUI. The menu including multiple menu items may be constructed in a tree structure. As the number of contents becomes lager, classifications of movies become more complicated. The tree structured menu also becomes more complicated. Accordingly, it is a time consuming process for finding a target movie from numerous movies through the typical tree structured menu. For example, in order to find a movie "Cars," a user may be required to know which at least one menu item of a menu is related the movie "Cars." When the user does not know which menu item is related to the movie "Cars," the user might need to select at least one or all of menu items associated with "Animation", "Family movies", and "Child movie." Furthermore, when a user searches for a specific movie within a popular menu item such as "Movie", "Foreign Movie", and "Romance," the user might need to check about more than thousand movies before finding a target movie.

In case of using a remote controller for controlling user equipment such as a TV, it might be difficult to operate the remote controller for selecting one of menu items or for entering a search word into a search word input box. Therefore, the user might easily give up before finding the target content. Such inconvenience and annoying process of finding the target content might degrade the reliability of a related service provider.

In accordance with at least one embodiment of the present invention, server 100 may receive a query word from user equipment 200, which is generated based on a user input for selecting at least one of menu items in the menu or based on a search word entered in a search word input box. Server 100 may determine contents related to the query word and dynamically regenerate menu based on the determined contents. Server 100 may provide a list of the determined contents together with the generated interactive menu. Such dynamic and interactive menu for contents search may be reconstructed based on user inputs and enable a user to efficiently and conveniently find a target content from numerous stored contents with fewer search steps.

The dynamic and interactive menu was described as being applied to the IPTV service, but the present invention is not limited thereto. The dynamic and interactive menu in accordance with at least one embodiment of the present invention can be applied to various application fields requiring contents search.

Furthermore, the dynamic and interactive menu is described as being generated in server 100, but the present invention is not limited thereto. Such dynamic and interactive menu may be generated by user equipment 200 in some embodiments. In this case, user equipment 200 may be installed with a software application for generating such a dynamic and interactive menu.

As described, server 100 may dynamically generate interactive menu based on at least one query word received from user equipment 200 and provide such interactive menu to user equipment 200 for efficient contents search. Such server 100 will be described in detail with reference to FIG. 2. For convenience and ease of understanding, server 100 will be described as a server used for an IPTV service requiring searching for movies. The present invention, however, is not limited thereto. Server 100 may be used for other services that requires contents search, for example, searching for songs, apps, and documents.

Figure 2:
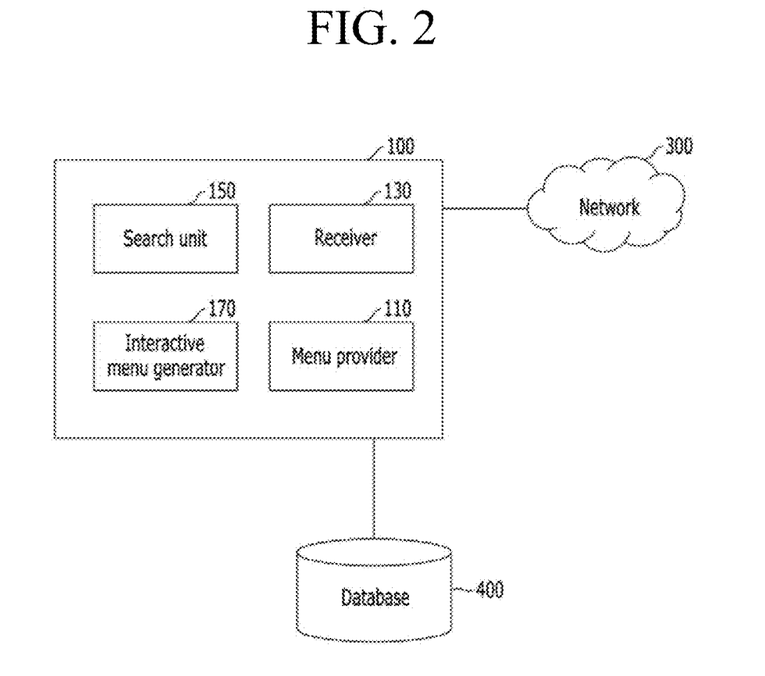
FIG. 2 shows a server for providing a dynamic and interactive menu in accordance with at least one embodiment of the present invention.

FIG. 2 shows a server for providing a dynamic and interactive menu in accordance with at least one embodiment of the present invention.

Referring to FIG. 2, server 100 may include menu provider 110, receiver 130, search unit 150, and interactive menu generator 170 in accordance with at least one embodiment of the present invention. Such server 100 may be coupled to database 400 that stores numerous digital contents each including a corresponding metadata. Such metadata may include information of respective digital content.

Menu provider 110 may provide an initial menu data to user equipment 200 when user equipment 200 initially accesses server 100 for an IPTV service or when user equipment 200 is initiated. The initial menu data may be referred to as a default menu data. For example, user equipment 200 may receive the initial menu data and produce and display an initial menu within a default GUI for a related service. The initial menu may include at least one menu item associated with a corresponding keyword. The keyword may be for retrieving a set of contents having the same attributes related to the keyword. In case of the IPTV service, the keyword may include at least one of genres, main actors, producers, and directors of movies stored in database 400. Furthermore, the keyword can be any words indicating one of attributes of movies and TV shows. Accordingly, the keyword may be any word expressing a main theme (e.g., revenge, escape, victory) and a mood (e.g., happy, funny, sorrow), but the present invention is not limited thereto. Information on such attributes may be stored in metadata of each one of contents stored in database 400.

In addition, menu provider 110 may provide an interactive menu to user equipment 200 after server 100 receives a query word from user equipment 200. That is, menu provider 110 may provide the interactive menu data to user equipment 200 after interactive menu generator 170 generates the interactive menu based on a query word received from user equipment 200.

Receiver 130 may receive a query word from user equipment 200. The received query word may be generated based on at least one of keywords associated with menu items in the initial menu or the interactive menu. For example, user equipment 200 may generate the query word based on a keyword associated with a menu item selected by a user input. Furthermore, the received query word may be a search word entered into a search word input box provided within the default GUI of a related service. User equipment 200 may transmit, as the query word, the search word entered into a search word input box of the default GUI.

Search unit 150 may select contents related to the received query word from those stored in database 400. For searching and selecting contents related to the query word, search unit 150 may determine a similarity level between the query word and metadata of each one of contents and select contents based on the determined similarity level. The determining of the similarity level may be performed based on a contents-tag generated based on web mining. Such method is disclosed in Korea Application No. 10-2010-0132344 (filed on Dec. 22, 2010 and by the same applicant and the same inventor), which is hereby incorporated by reference in its entirety. Accordingly, the detailed description thereof will be omitted herein.

Furthermore, when search unit 150 determines that multiple contents related to the query word, search unit 150 may assign a priority to each one of the multiple contents related to the query word and select at least one of contents based on the assigned priority. For example, search unit 150 may select contents having comparatively higher priority from the determined multiple contents related to the query word. Such priority may be determined based on the similarity level and at least one of attributes of respective contents. For example, the attributes of respective contents may be various types of information related to a respective content, such as a retrieval ranking, a real-time retrieval ranking, the number of hits, a registration order, a popularity ranking, and the number of news or blogs related thereto. In order to determine a priority of each one of the determined multiple contents, various types of equations may be used. For example, when a popularity ranking of each one of contents is expressed as one of integers from 1 to 5, search unit 150 may use an equation of: a priority of contents=(similarity level)*(a popularity ranking of corresponding contents).

Interactive menu generator 170 may dynamically generate an interactive menu data based on the selected contents. Interactive menu generator 170 may provide the generated interactive menu data to user equipment 200 through menu provider 110. For example, interactive menu generator 170 may determine at least one keyword based on the selected contents and generate the interactive menu data to include menu items each associated with the determined keywords. Such keyword may be extracted from the selected contents based on metadata thereof or contents-tags generated through web-mining. For example, keywords may be extracted from attributes included in a metadata of each one of the selected contents and the interactive menu may be generated to include menu items each associated with each extracted keyword. Such attributes included in the metadata may include information on a corresponding content, such as a genre, main actors, a director, a procedure, and so forth. Furthermore, the attributes may include a main theme (e.g., revenge, escape, victory), and a representative mood or a representative emotional word (e.g., happy, funny, sorrow). Such attribute information may be included in the metadata as an adjective word, a noun word, and a verb word. Such information may be extracted from the metadata and used as a keyword for the interactive menu data in accordance with at least one embodiment of the present invention.

Interactive menu generator 170 may regenerate interactive menu whenever a query word is received from user equipment 200. For example, when server 100 receives a second query word from user equipment 200 after providing the interactive menu generated based on a previously received query word (e.g., first query word), interactive menu generator 170 regenerate the interactive menu, as a second interactive menu, by determining keywords based on the second query word together with the first query word. Particularly, interactive menu generator 170 receives a first query word of "A" and provides first interactive menu based on the first query word of "A". Then, interactive menu generator 170 may receive a second query word of "B" from user equipment 200 in response to the first interactive menu. In this case, the interactive menu generator 170 may determine keywords for the second interactive menu data based on both of the first query word of "A" and the second query word of "B."

Furthermore, interactive menu generator 170 may select contents related to the second query word of "B" from contents previously selected based on the first query word of "A," but the present invention is not limited thereto. In some embodiments, interactive menu generator 170 may select contents related to the second query word of "B" and the first query word of "A" (e.g., A AND B) from entire contents stored in database 400.

After providing the second interactive menu data, server 100 may receive another query word from user equipment 200 as a third query word. In this case, such third query word may be considered with the first and second query words for regenerating the interactive menu data. For example, when a third query word of "C" is received from user equipment 200, interactive menu generator 170 may select contents related to the third query word of "C" from previously contents selected based on the second query word of "B" and the first query word of "A." Alternatively, interactive menu generator 170 may select contents related to the third query word of "C", the second query word of "B", and the first query word of "A" from entire database. If the second query word "B" is deleted, interactive menu generator 170 may select contents related to the third query word "C" and the first query word "A" from entire database. Such query word may be one of a keyword associated with a menu item selected by a user selection input or a search word entered into a search word input box. Furthermore, a query word may be a related search word, a similar search word, and a recommended search word, which are automatically provided by server 100.

When menu provider 110 provides the interactive menu data to user equipment 200, a list of the selected contents may be provided together with the generated interactive menu in accordance with at least one embodiment of the present invention. When user equipment 200 requests one of the contents included in the list by transmitting a related request signal to server 100, server 100 may provide the request content to user equipment 200. For example, the interactive menu data may be generated based on the first query word and provided to user equipment 200. In this case, a list of contents selected based on the first query word for generating keywords for the interactive menu data is also provided with the interactive menu data to user equipment 200. Such a list of contents may be displayed a contents display area in a default GUI, which is distinct from an area for displaying the interactive menu, but the present invention is not limited thereto. The list of contents and the interactive menu may be displayed to be overlapped to each other. Furthermore, the list of contents may be displayed in third dimension (3D) effect. Furthermore, when one of contents displayed in the contents display area is selected, the selected contents may be provided to user equipment 200 for reproduction or detail information of the selected contents may be provided to user equipment 200. Furthermore, such a list of the selected contents may be stored in a temporal storage and a history thereof may be recorded. The list of selected contents may be displayed in the contents display area with related image and detail information in order to enable a user to easily and conveniently browse the contents.

When the provided list does not include a target content that a user wants, searching may be continued by inputting another search word in a search word input box or by selecting another menu item included in the interactive menu in accordance with at least one embodiment of the present invention. Furthermore, a user may select one of contents displayed in the contents display area of the default GUI for reproducing or for detailed information. When the user selects one for reproducing, a selected content may be provided to user equipment 200.

Figure 3:
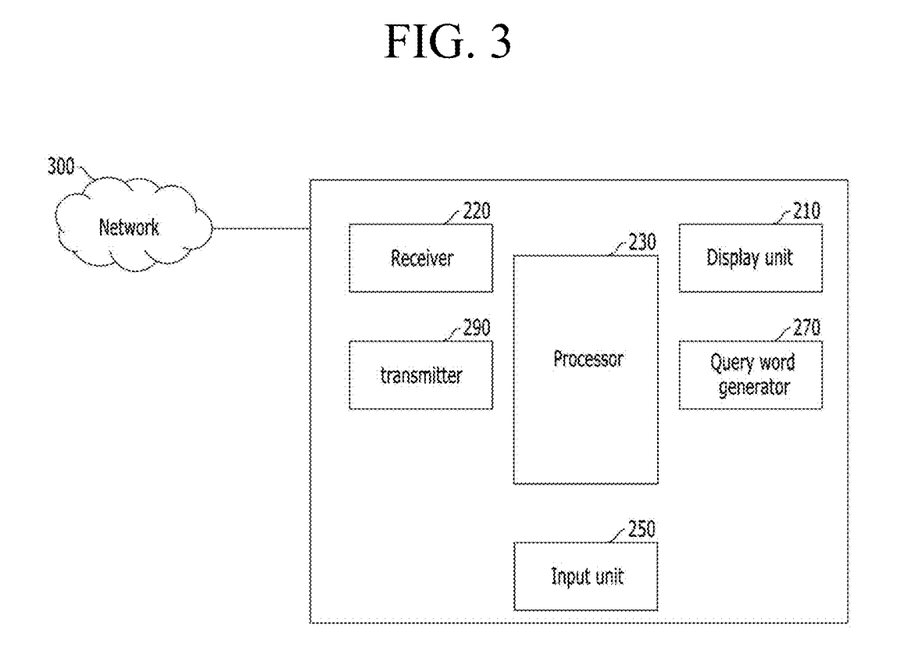
FIG. 3 shows user equipment in accordance with at least one embodiment of the present invention.

FIG. 3 shows user equipment in accordance with at least one embodiment of the present invention.

Referring to FIG. 3, user equipment 200 may include display unit 210, receiver 220, processor 230, input unit 250, query word generator 270, and transmitter 290. User equipment 200 may be a device capable of accessing server 100 and communicating with server 100 at a remote location through network 300. For example, user equipment 200 may include a television set, a computer, and a portable electronic device. Particularly, user equipment 200 may include a smart TV, an IPTV set-top box, a laptop installed with a web-browser, a desktop computer, a pad-type device, a personal communication system (PCS) terminal, a global system for mobile communication (GSM) terminal, a personal digital cellular (PDC) terminal, a personal handy phone system (PHS) terminal, a personal digital assistant (PDA) terminal, an international mobile telecommunication (IMT)-2000 terminal, a code division multiple access (CDMA)-2000 terminal, a wide code division multiple access (W-CDMA) terminal, a wireless broadband Internet (WiBro) terminal, a smart phone, a tablet PC, and so forth.

Receiver 220 may receive initial menu data and interactive menu data from server 100. The initial menu data may be for a default menu and received when user equipment 200 initially accesses server 200 or when user equipment 200 is initiated. The interactive menu data may be received after transmitting a query word generated based on a user input made in response to the initial menu.

Processor 230 may process the initial menu data received from server 100 and display the initial menu on display device 210. Furthermore, processor 230 may process the interactive menu data received from server 100 and display the interactive menu on display device 210 instead of the initial menu or together with the initial menu. Particularly, processor 230 may process the initial menu data and the interactive menu data to display the initial menu and the interactive menu in various methods. For example, the initial menu may be displayed on one side of display device 210 and the interactive menu may be displayed the other side of display device 210. Such initial menu and interactive menu may be expanded in proportional to the number of menu items in the initial menu and the interactive menu. Furthermore, the initial menu and the interactive menu may be overlapped to each other or at least one of menu items in the initial menu and the interactive menu may be omitted or displayed transparently.

Processor 230 may display images of contents in the received contents list on display unit 210. Particularly, processor 230 may display images of contents in the received contents list in contents display area 1030 of GUI 1000 as shown in FIG. 1. For example, such content image may include at least one of a representative image of a corresponding content, detailed information thereof, and a reproducing icon for reproducing the corresponding content.

In addition, processor 230 may display the at least one content image in 3D based on the priority of each content. For example, processor 230 may display images of contents having comparatively higher priority in front of images of contents having comparatively lower priority. That is, process 230 may display images of contents having comparatively higher priority with a comparatively smaller depth value and display images of contents having comparatively lower priority with a comparatively larger depth value. Furthermore, the number of content images arranged with a first depth value is smaller than that arranged with a second depth value, where the first depth value is smaller than the second depth value. Particularly, images of contents having a higher priority may be displayed in front of images of contents having a comparatively lower priority. That is, content images may be displayed in a cone shape. Processor 230 may display the content images to be rotated from back to front or front to back (e.g., flipping) or from a right side to a left side while maintaining a cone shape. The present invention, however, is not limited thereto. Such content images may be displayed in various shapes. Moreover, processor 230 may display one arranged at very front with color (or full color) and display the others arranged behind the one with black and white (or one color). Such content images may be overlapped to each other. Processor 230 may also display a search word input box. For example, processor 230 may display search word input box 1020 within default GUI 1000.

Input unit 250 may be a user interface for receiving a user input corresponding to at least one keyword. The user input may be a selection input for selecting at least one menu item in one of the initial menu and the interactive menu or a search word entered into a search word input box. Input unit 250 may further include a remote controller and a voice recognition interface. The voice recognition interface may enable a user to select one of menu items or to enter a search word by a voice command.

Query word generator 270 may generate a query word corresponding to the user input. For example, query word generator 270 may determine a keyword associated a selected menu item in the initial menu or the interactive menu and generate the query word based on the keyword. Query word generator 270 may use the determined keyword as the query word. Furthermore, query word generator 270 may generate a query word based on a search word entered into the search word input box provided within the default GUI. Also, query word generator 270 may use the entered search word as the query word.

Transmitter 290 may transmit the generated query word to server 100 through network 300. Sever 100 may use such query word to select at least one of contents and dynamically generate the interactive menu based on the selected at least one of contents. Receiver 220 of user equipment 200 may receive the interactive menu and a list of at least one of selected contents from server 100. The at least one of contents may be selected based on a similarity level between the query word and the metadata of each one of contents and the attributes of each one of contents.

Hereinafter, a method for providing a dynamic and interactive menu for contents search in accordance with at least one embodiment of the present invention will be described with reference to FIG. 4 and FIG. 5. For convenience and ease of understanding, the method will be described for providing a dynamic and interactive menu for an IPTV service. The present invention, however, is not limited thereto. As described, the method will be applied to various application fields requiring contents search, for example, searching for songs, apps, and documents from numerous related digital contents.

Figure 4:
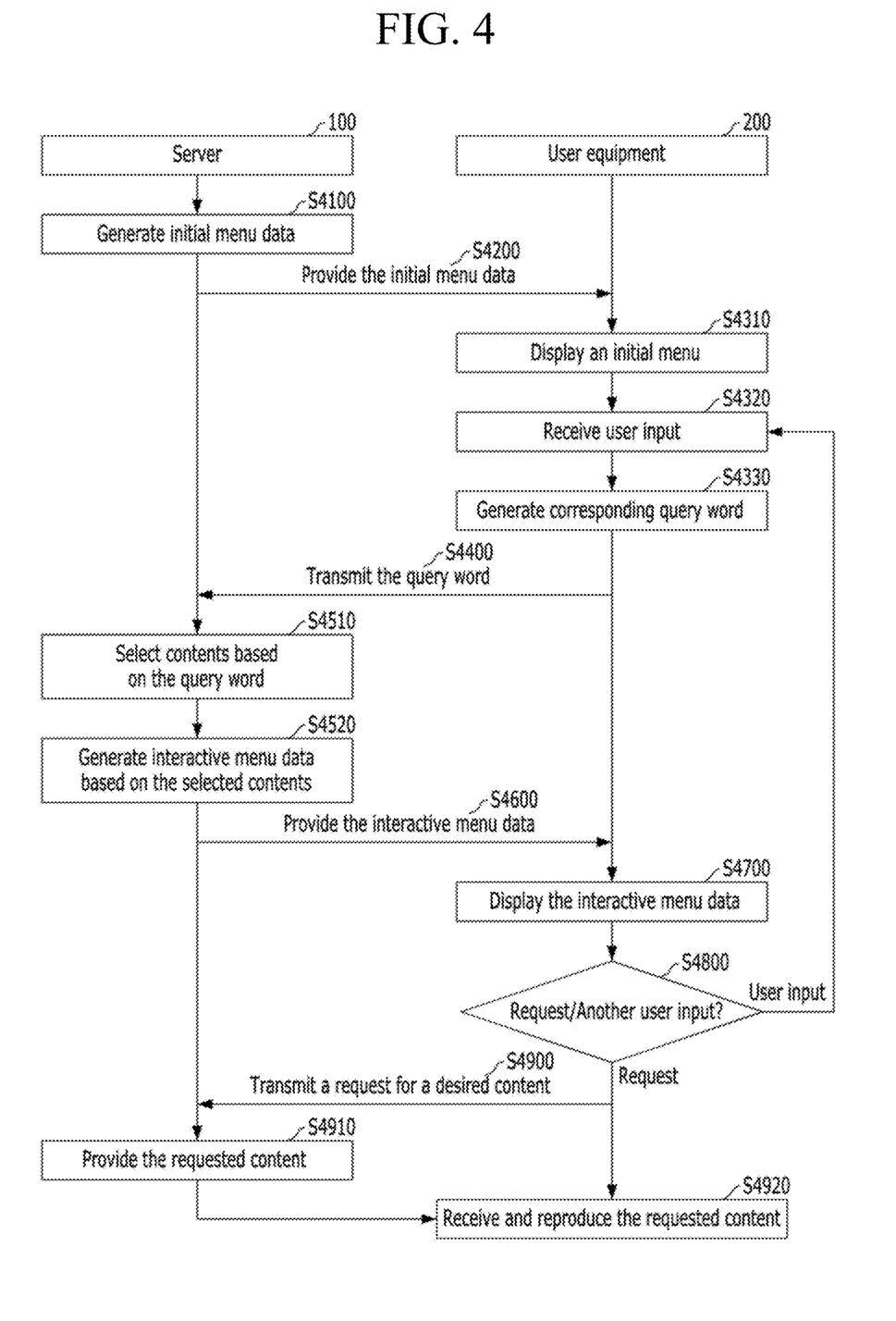
FIG. 4 shows a method for providing a dynamic and interactive menu for an IPTV service in accordance with at least one embodiment of the present invention.

FIG. 4 shows a method for providing a dynamic and interactive menu for an IPTV service in accordance with at least one embodiment of the present invention.

Referring to FIG. 4, initial menu data may be generated at step S4100. For example, server 100 generates the initial menu data when user equipment 200 initially accesses server 100 for an IPTV service. Such initial menu data may be a default menu for the IPTV service. The default GUI 1000 for the IPTV service may include menu 1010, search word input box 1020, and contents display area 1030 as shown in FIG. 1. The initial menu data may be processed to the initial menu and displayed as menu 1010, but the present invention is not limited thereto. The initial menu data may be displayed in various forms. At step S4200, the generated initial menu data may be provided to user equipment 200. For example, server 100 transmits the generated initial menu data to user equipment 200 through network 300.

At step S4310, the initial menu data may be processed and displayed as an initial menu. For example, user equipment 200 receives the initial menu data from server 100. User equipment 200 processes the initial menu data and displays the initial menu as menu 1010 on display unit 210 with default GUI 1000 for the IPTV service as shown in FIG. 1. Such an initial menu may include at least one menu item associate with a respective keyword. For example, the initial menu may include a first menu item associated with a keyword of "Action movies", a second menu item associated with a keyword of "Family movies", a third menu item associated with a keyword of "Animation movies", and so forth.

At step S4320, a user input may be received from a user. For example, user equipment 200 may receive at least one user inputs from the user through menu 1010 and/or through search word input box 1020 as shown in FIG. 1. Such user input may be a user selection input for selecting at least one of the menu items included in the initial menu or words entered into search word input box 1020. For example, when a user clicks the first menu item of the initial menu, the user input may be a keyword associated with the first menu item, which may be "Action movies." When a user enters words "funny story" in search word input box, the user input may be "funny story".

At step S4330, a query word may be generated based on the received user input. For example, user equipment 200 may generate a query word based on the received user input. Such query word may be a keyword associated with a menu item selected by a user. Furthermore, the query word may be words entered into search word input box 1020. That is, user equipment 200 may generate the query word of "Action movies" when the user selects the first menu item of the initial menu. User equipment 200 may use words entered into search word input box 1020, such as "funny story." At step S4400, the generated query word may be transmitted to server 100. For example, user equipment 200 transmits the generated query word such as "Action movies" or "funny story" to server 100 through network 300.

At step S4510, contents related to the query word may be searched for and selected. For example, server 100 searches for and selects movies and TV shows related to the received query word from those stored in database 400. When the received query word is "Action movies," server 100 selects action movies from those stored in database 400. When the received query word is "funny story," server 100 selects movies having a funny story from those stored in database 400. Furthermore, server 100 may select action movies having a funny story from those stored in database 400 when both of the query words "Action movies" and "funny story" are received from user equipment 200.

At step S4520, an interactive menu data may be generated based on the selected contents. For example, server 100 may analyze information on the selected movies and generate menu data based on the analysis result. That is, server 100 may regenerate menu data for menu 1010 interactively to the received query words which are generated based on the user inputs made on the initial menu and/or the keyword search box. Accordingly, server 100 generates the interactive menu data based on the result of analyzing the selected movies or TV shows. Particularly, server 100 extracts keywords from the selected movies and generates the interactive menu to include menu items each associated with the extracted keywords in accordance with at least one embodiment of the present invention.

At step S4600, the interactive menu data may be provided to user equipment 200. For example, server 100 transmits the generated interactive menu data to user equipment 200 through network 300. Furthermore, server 100 may transmit a list of movies selected based on the received query word, which are used to generate the interactive menu data.

At step S4700, the interactive menu data may be processed to an interactive menu and the interactive menu may be displayed. For example, user equipment 200 receives the interactive menu data from server 100 through network 300 and processes the received interactive menu data. User equipment 200 displays the interactive menu on display unit 210 as a result of processing the received interactive menu data. Particularly, user equipment 200 displays the interactive menu as menu 1010 as shown FIG. 1. That is, instead of displaying the initial menu, the interactive menu is displayed as menu 1010. The interactive menu is different from the initial menu and the interactive menu may provide narrow downed options to a user for finding desired contents with fewer search steps. Furthermore, user equipment 200 may receive the list of movies selected based on the query word from server 100 and display the movies in the list in contents display area 1030.

At step S4800, determination may be made whether a received user input is a request for a selected movie, a user selection input for selecting one of menu items in the interactive menu, or a word entered into a search word input box for further search when a user input is received after displaying the interactive menu. For example, when user equipment 200 receives a user input after displaying the interactive menu, user equipment 200 determines whether the received user input for requesting a movie selected from movies displayed in contents display area 1030, for selecting one of menu items in the interactive menu, or for further search by entering words in search word input box 1020. A user may find a desired movie among movies displayed in contents display area 1030. In this case, the user selects the desired movie and such selection may be a request for the selected movie. Furthermore, if the user does not find a desired movie among movies displayed in contents display area 1030, the user may select one of menu items in the interactive menu or enters another word in search word input box 1020 for further search.

When the user input is one of a user selection input for selecting one of menu items in the interactive menu and a word entered for further search (User input—S4800), the steps S4320 to S4700 may be carried out for regenerating the interactive menu based on the new user input. Accordingly, whenever a user selects one of menu items in provided menu 1010 or whenever a user enters words into search word input box 1020, menu may be regenerated dynamically and interactively in response to user inputs in accordance with at least one embodiment of the present invention.

When the user input is the request for a desired movie (Request—S4800), user equipment 200 may transmit a request for the selected movie to server 100 at step S4900. Upon the request, server 100 may provide the requested movie to user equipment 200 at step S4910 and user equipment 200 may reproduce the provided movie through display unit 210 at step S4920.

Such a method for providing an interactive menu based on user input in accordance with at least one embodiment of the present invention will be described based on an example of the IPTV service. When a user turns on a television set having an IPTV function, server 100 may provide an initial menu having menu items of "action movie", "comedy movies", "romance movie", "family movie", and so forth. Among the menu items of the initial menu, a user may select the menu item of "comedy movies". In this case, the television set transmits a query word of "comedy movies" to server 100. Server 100 selects comedy movies from database 400 and assigns priorities to the selected comedy movies. Server 100 further selects comedy movies having comparatively higher priorities and extracts keywords from attributes in metadata of the selected comedy movies having comparatively higher priorities. Server 100 generates the interactive menu based on the extracted keywords and transmits the interactive menu to the television set with the list of the selected comedy movies having comparatively higher priorities. Accordingly, the interactive menu may include menu items of main actors (e.g., Owen Wilson, Adam Sandler, Ben Stiller, Eddie Murphy, and so forth), directors (e.g., Mel Brooks, Jerry Lewis, Peter Bogdanovich, and so forth), main themes related to comedy movies (e.g., love, friendship, and so forth), or other information (e.g., movie for family, movie for lover, funny movie, and so forth). Server 200 may transmit the list of all selected movies to the television set or the list of the certain number of selected movies having higher priorities. The television set displays the interactive menu with the movies included in the list on content display area 1030.

When a user finds a desired movie from the movies displayed in content display area 1030, the user selects the desired movie and the television set starts playing back the selected movie. When the user selects the menu item of "Owen Wilson" in the interactive menu because the user does not find a desired movie, a query word of "Owen Wilson" is transmitted to server 100 and the interactive menu is regenerated based on the query word of "Comedy movie" and "Own Wilson". That is, server 100 selects movies related to "Comedy movie" and "Own Wilson", such as Midnight in Paris, Wedding Crashers, Hall Pass, The Internship, and so forth. Server 100 extracts keywords from attributes of the selected movies and regenerates the interactive menu based on the extracted keywords. Accordingly, the interactive menu may include menu items of co-actors (e.g., Vince Vaughn, Ben Stiller, Wes Anderson, and so forth), and main theme (e.g., police, wedding, Paris, and so forth). Such interactive menu may be provided to the television set with the list of the selected movies. Such interactive menu with the list of the selected movies may enable the user to efficiently and conveniently find a desired movie with fewer search steps.

As described, server 100 may generate interactive menu data according to user inputs and provide the generated interactive menu data to user equipment 200 in accordance with at least one embodiment of the present invention. Such operations of server 100 will be described in detail with reference to FIG. 5.

Figure 5:
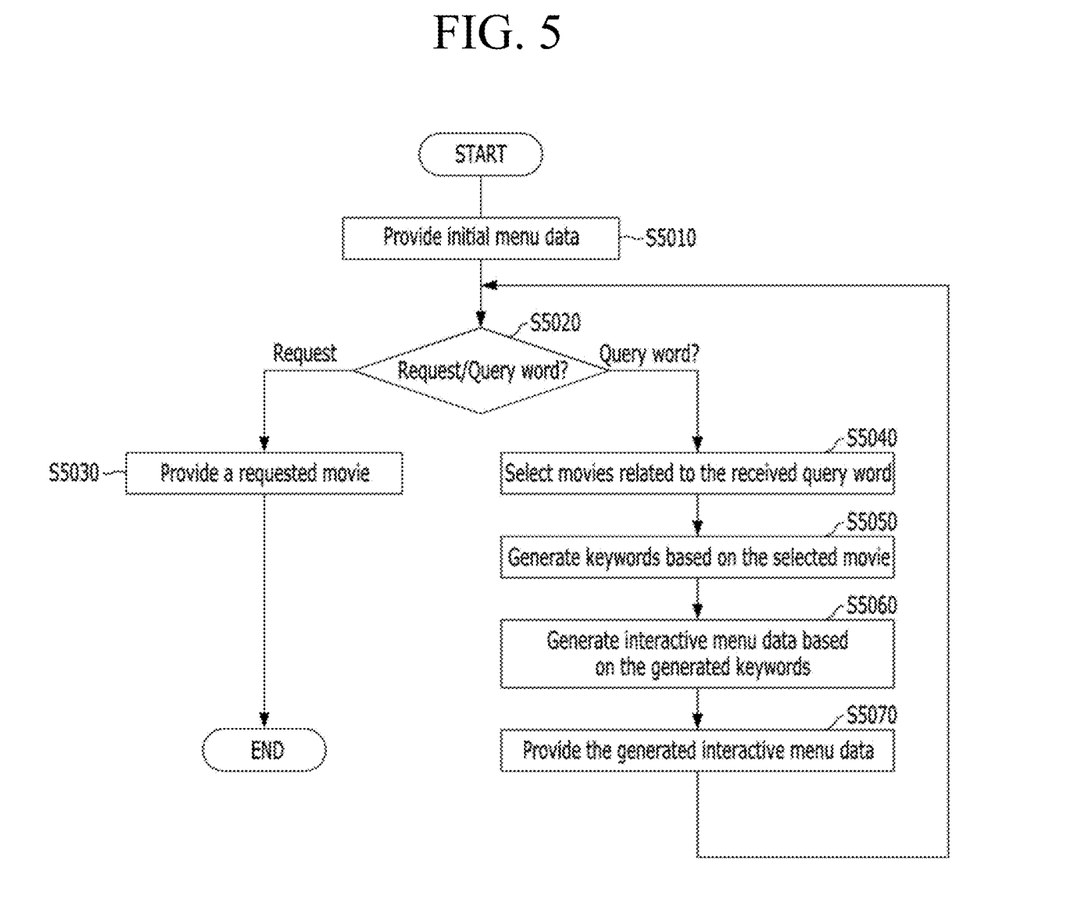
FIG. 5 shows a method of a server for providing a dynamic and interactive menu based on user inputs for an IPTV service in accordance with at least one embodiment of the present invention.

FIG. 5 shows a method of a server for providing a dynamic and interactive menu based on user inputs for an IPTV service in accordance with at least one embodiment of the present invention.

Referring to FIG. 5, server 100 generates initial menu data and provides the generated initial menu data to user equipment 200 through communication network 300 at step S5010 when user equipment 200 is initiated or when user equipment 200 initially accesses server 100 for an IPTV service.

After providing the initial menu data, server 100 may wait for user inputs transmitted from user equipment 200. Upon the receipt of the user inputs, server 100 may determine whether the received user input is a request for a selected movie or a query word at step S5020. When the received user input is the request (Request—S5020), server 100 may provide the request movie to user equipment 200 at step S5030.

When the received user input is the query word (Query word—S5020), server 100 may select movies associated with the received query word from database 400 at step S5040. For example, server 100 may select movies based on a similarity level between the received query word and attributes in metadata of each one of movies stored in database 400. Sever 100 may assign a priority to each one of the selected movies based on the determined similarity level and the attributes of each one of the selected movies. Sever 100 may select movies having comparatively higher priorities as movies related to the query word.

Server 100 may generate keywords from the selected movies at step S5050. For example, server 100 may extract keywords from attributes of the selected movies. Server 100 may generate interactive menu data based on the extracted keywords at step S5060. For example, server 100 may generate the interactive menu data to include menu items each associated with the extracted keyword. Server 100 may provide the generated interactive menu data to user equipment 200 through network 300 at step S5070.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for providing an interactive menu data for contents search, the method comprising:
   providing an initial menu data to user equipment;
   receiving at least one query word from the user equipment, wherein the query word is associated with a content;
   determining a similarity level between the at least one query word and information included in meta data of each content;
   selecting contents based on the determined similarity level between the at least one query word and the information included in the meta data of each content;
   determining a priority of each selected content based on the determined similarity and attributes of each content;
   extracting at least one keyword from the selected contents based on the determined priority;
   regenerating a menu data as an interactive menu data based on the extracted at least one keyword; and
   providing the generated interactive menu data to the user equipment.

2. The method of claim 1, wherein the initial menu data includes a plurality of menu items each associated with a respective keyword.

3. The method of claim 1, further comprising:
assigning the determined priority to each content.

4. The method of claim 1, wherein the received at least one query word is a selection input for selecting at least one menu in the initial menu data; and
   the received user input is a search word entered to the user equipment.

5. The method of claim 1, further comprising:
   after providing the interactive menu data, receiving at least one second query word generated based on keywords associated with at least one menu item of the provided interactive menu data; and
   generating a second interactive menu data based on the received least one second query word with the previously received query word.

6. The method of claim 1, wherein the extracting at least one keyword includes:
   analyzing attributes included in the meta data of the selected contents; and
   generating the at least one keyword based on the analysis result.

7. The method of claim 6, wherein the attributes are information of each one of the contents and include at least one of a genre, main actors, co-actors, a director, a procedure, a main theme, a representative mood, and a representative emotional word.

8. A server for providing an interactive menu data for content searches, the server comprising:
   a receiver configured to receive at least one query word after providing an initial menu data to user equipment;
   a search unit configured to:
      select contents associated with the at least one query word from a plurality of contents stored in the server,
      determine a similarity level between the at least one query word and information included in meta data of each content,
      select contents based on the determined similarity level between the at least one query word and the information included in the meta data of each content,
      determine a priority of each selected content based on the determined similarity and attributes of each content, and
   an interactive menu generator configured to extract at least one keyword based on the selected contents based on the determined priority and to regenerate a menu data as an interactive menu data to include at least one menu item each associated with the determined at least one keyword; and
   a provider configured to provide the regenerated interactive menu data to the user equipment.

9. The server of claim 8, wherein the initial menu data includes a plurality of menu items each associated with a respective keyword.

10. The server of claim 8, wherein the search unit is configured to:
    assign the determined priority to each one of the selected contents.

11. The server of claim 8, wherein:
    the receiver is configured to, after providing the interactive menu data to the user equipment, receive at least one new query word generated based on keywords associated with at least one menu item of the provided interactive menu data; and
    the interactive menu generator is configured to regenerate the interactive menu data based on the received least one second query word with the previously received query word.

12. The server of claim 8, wherein the search unit is configured to:
    analyze attributes included in the meta data of the selected contents; and
    generate the at least one keyword based on the analysis result.

13. The method of claim 1, wherein determining the similarity level between the at least one query word and information included in meta data of each content is based on a contents-tag generated based on web mining.

14. The server of claim 8, wherein the similarity level between the at least one query word and information included in meta data of each content is determined based on a contents-tag generated based on web mining.

* * * * *